Dec. 31, 1935.  C. A. BIRKEBAK  2,025,706
MACHINE TOOL
Filed July 28, 1932   10 Sheets-Sheet 4

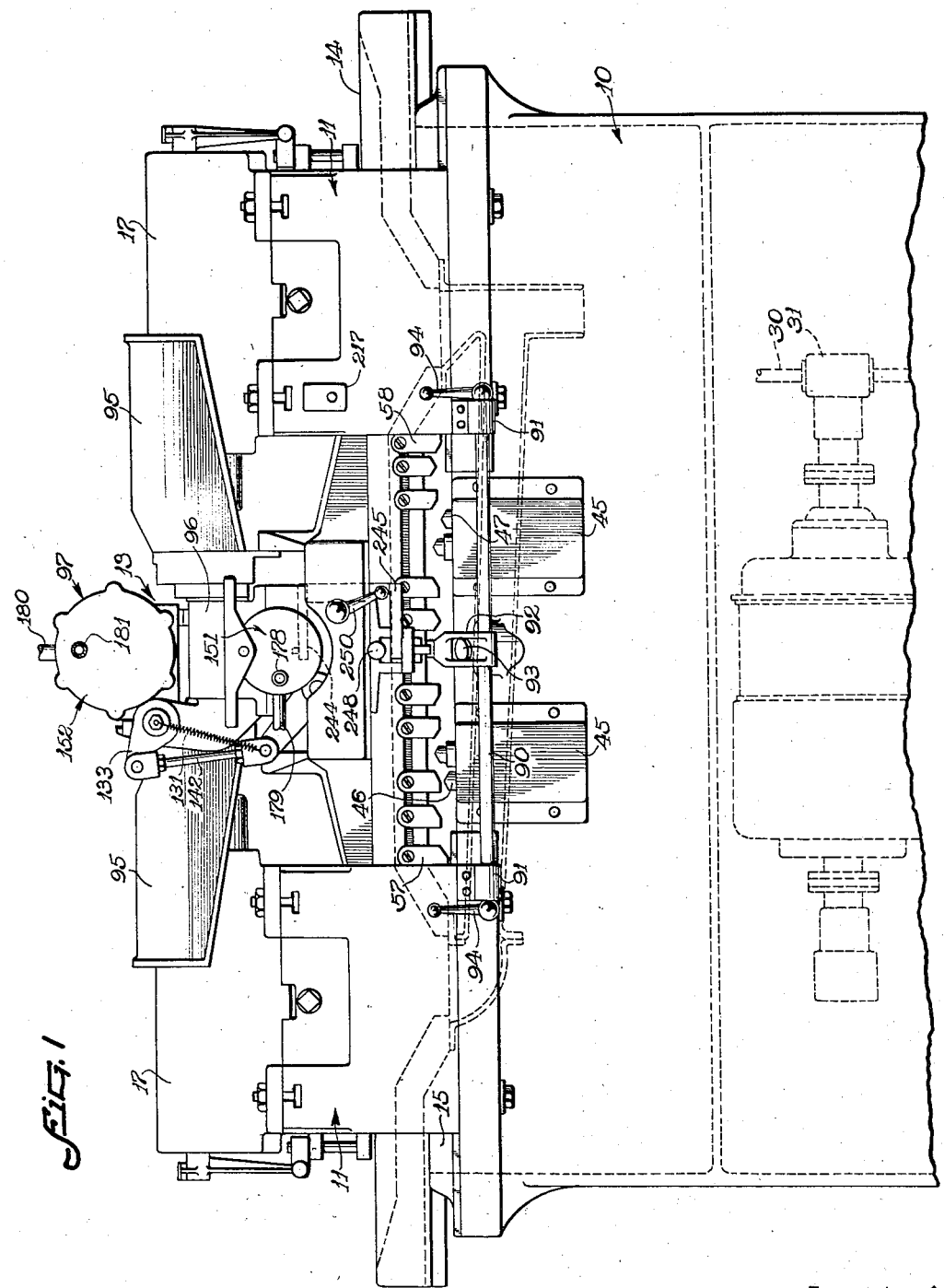

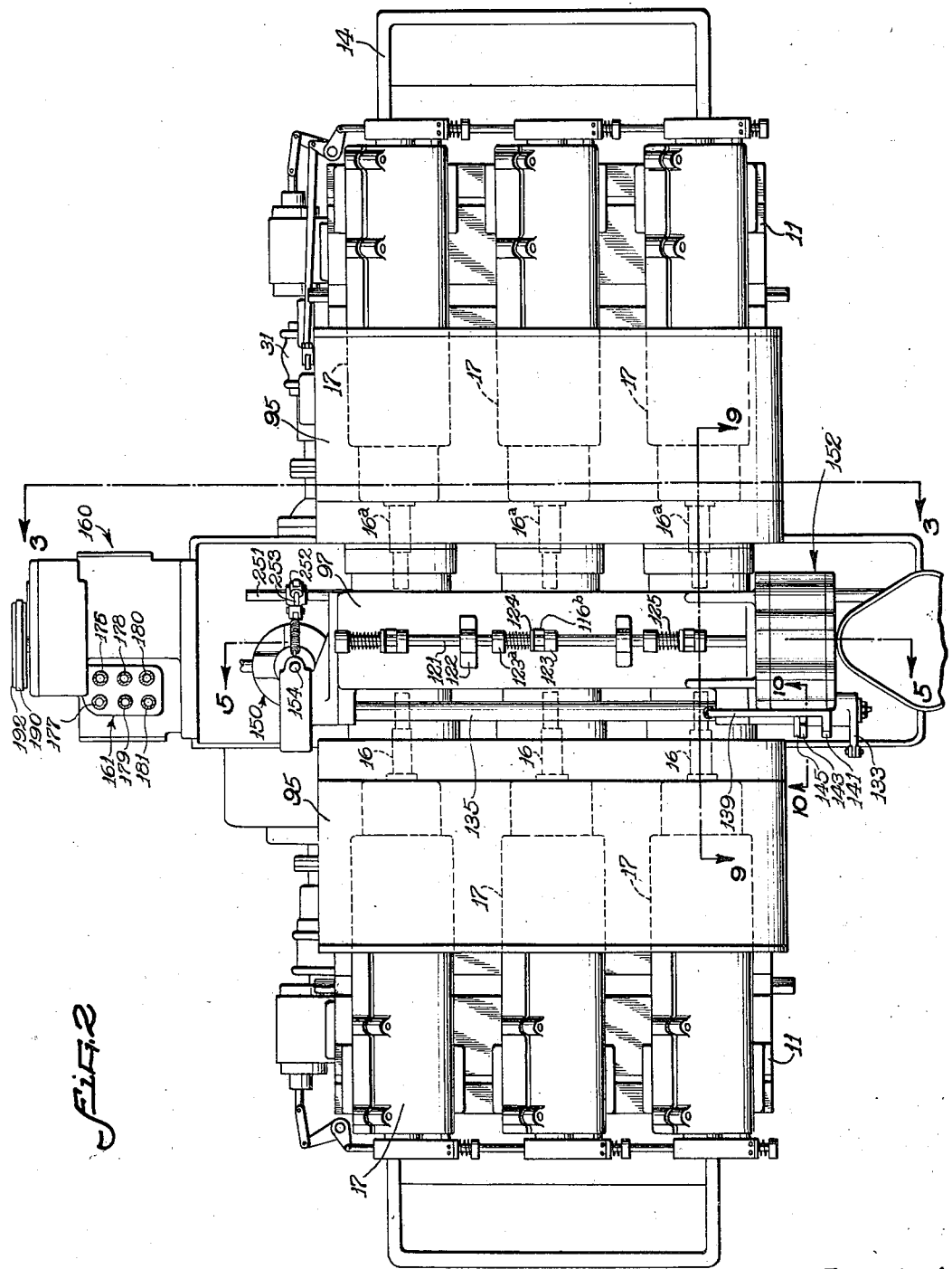

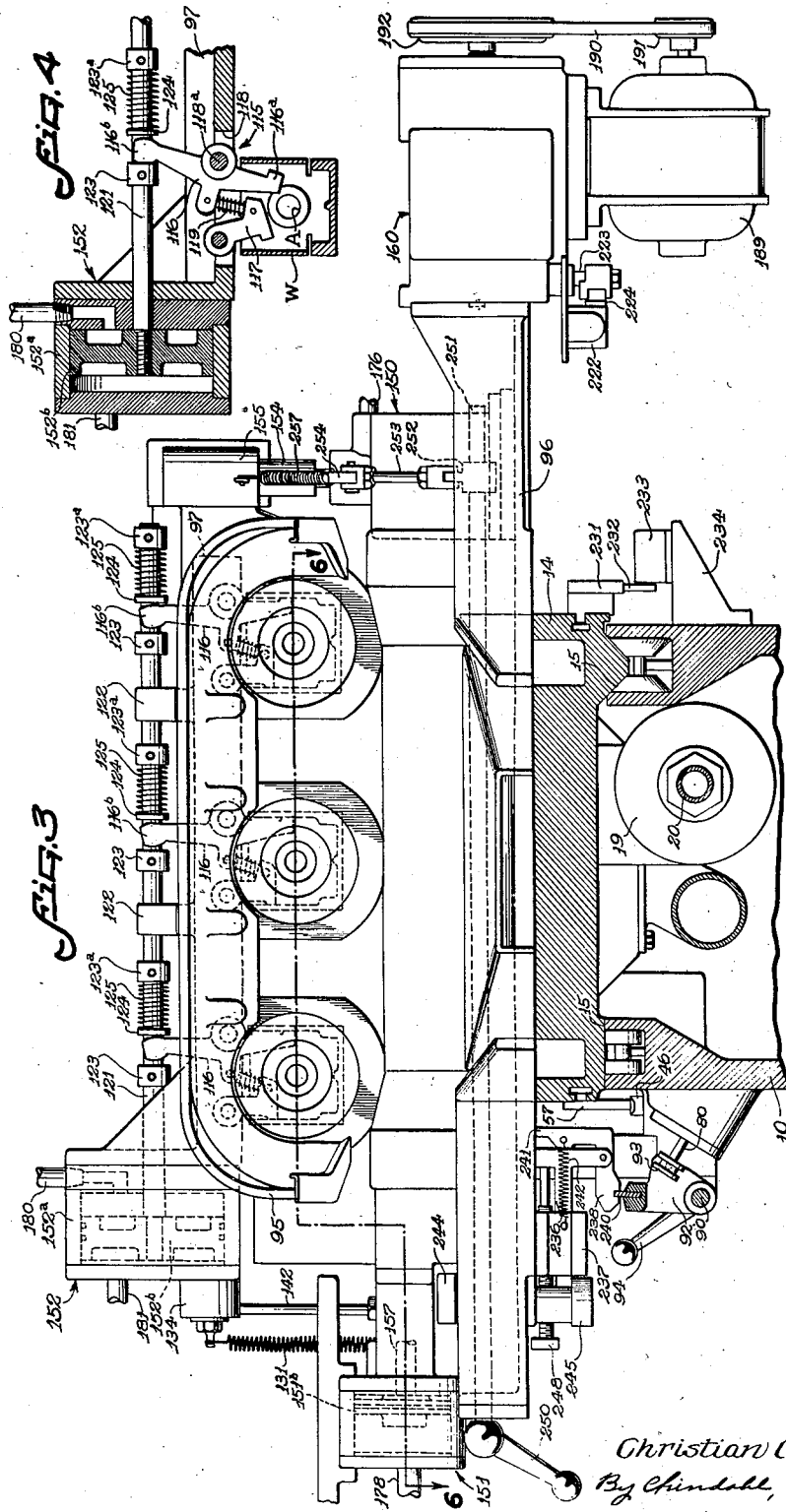

Inventor
Christian A. Birkebak
By Chindahl, Parker & Carlson
Attorneys

Dec. 31, 1935.　　　C. A. BIRKEBAK　　　2,025,706
MACHINE TOOL
Filed July 28, 1932　　10 Sheets-Sheet 5
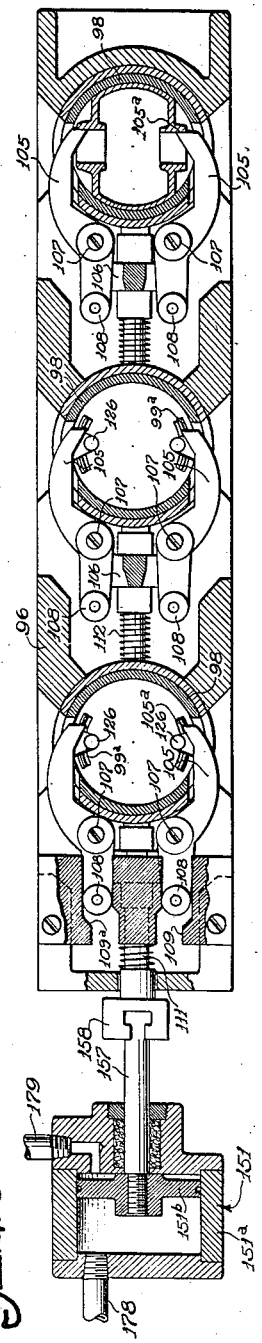
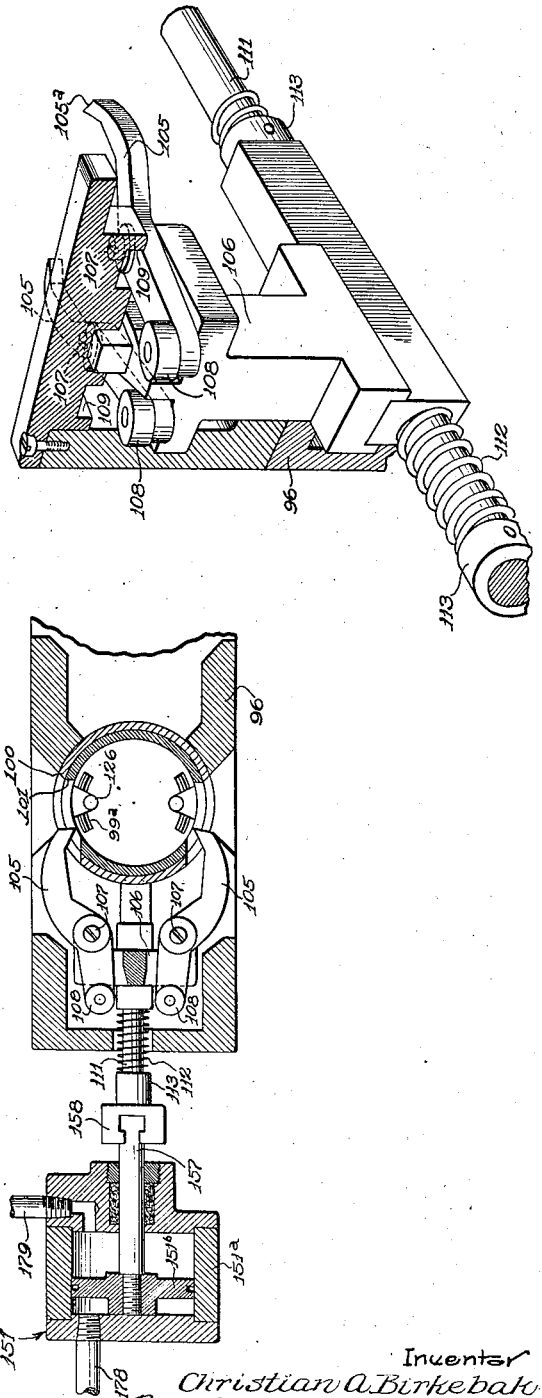
Inventor
Christian A. Birkebak
By Chindall, Parker & Carlson
Attorneys

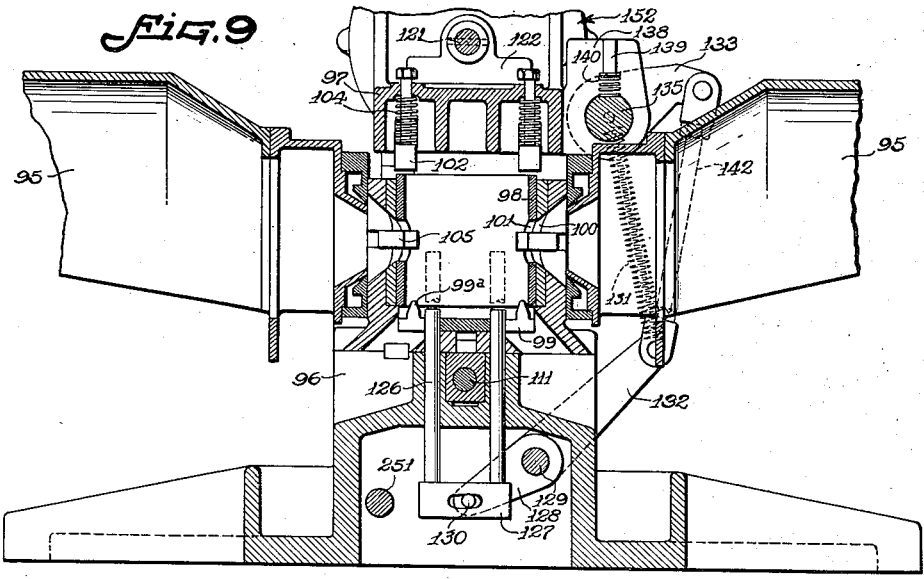

Dec. 31, 1935.  C. A. BIRKEBAK  2,025,706
MACHINE TOOL
Filed July 28, 1932     10 Sheets-Sheet 7

Inventor
Christian A. Birkebak
By Chindahl, Parker & Carlson
Attorneys

Dec. 31, 1935.　　　　C. A. BIRKEBAK　　　　2,025,706
MACHINE TOOL
Filed July 28, 1932　　　10 Sheets-Sheet 8
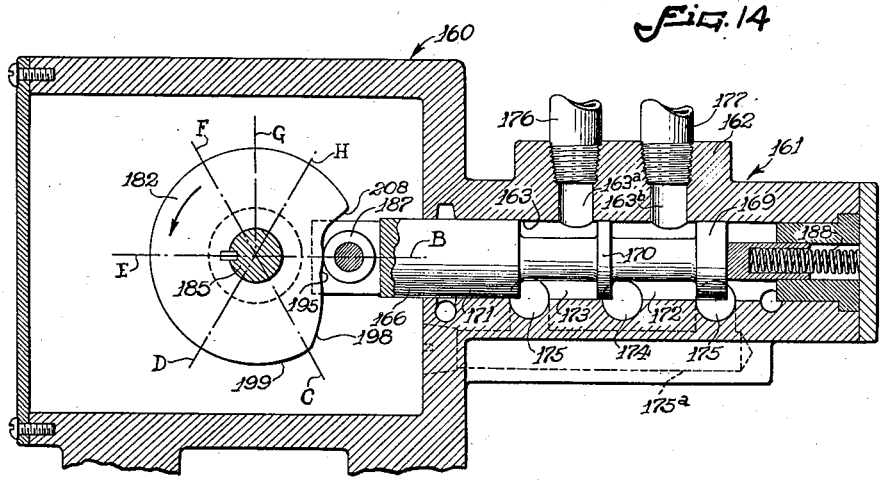
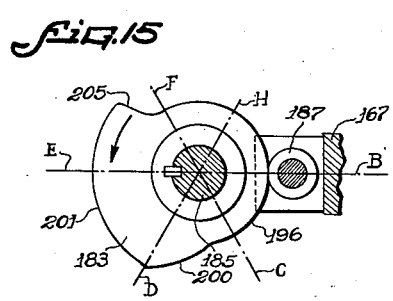 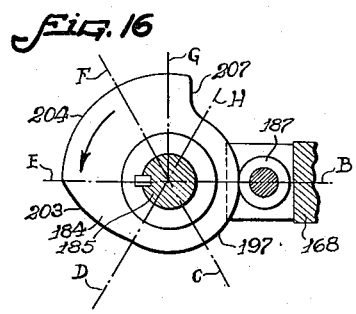
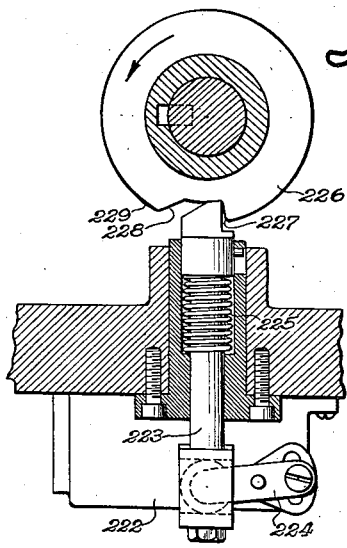
Inventor
Christian A. Birkebak
By Chindahl, Parker & Carlson
Attorneys Dec. 31, 1935.  C. A. BIRKEBAK  2,025,706
MACHINE TOOL
Filed July 28, 1932   10 Sheets-Sheet 9

Inventor
Christian A. Birkebak,
By Chindahl, Parker & Carlson
Attorneys

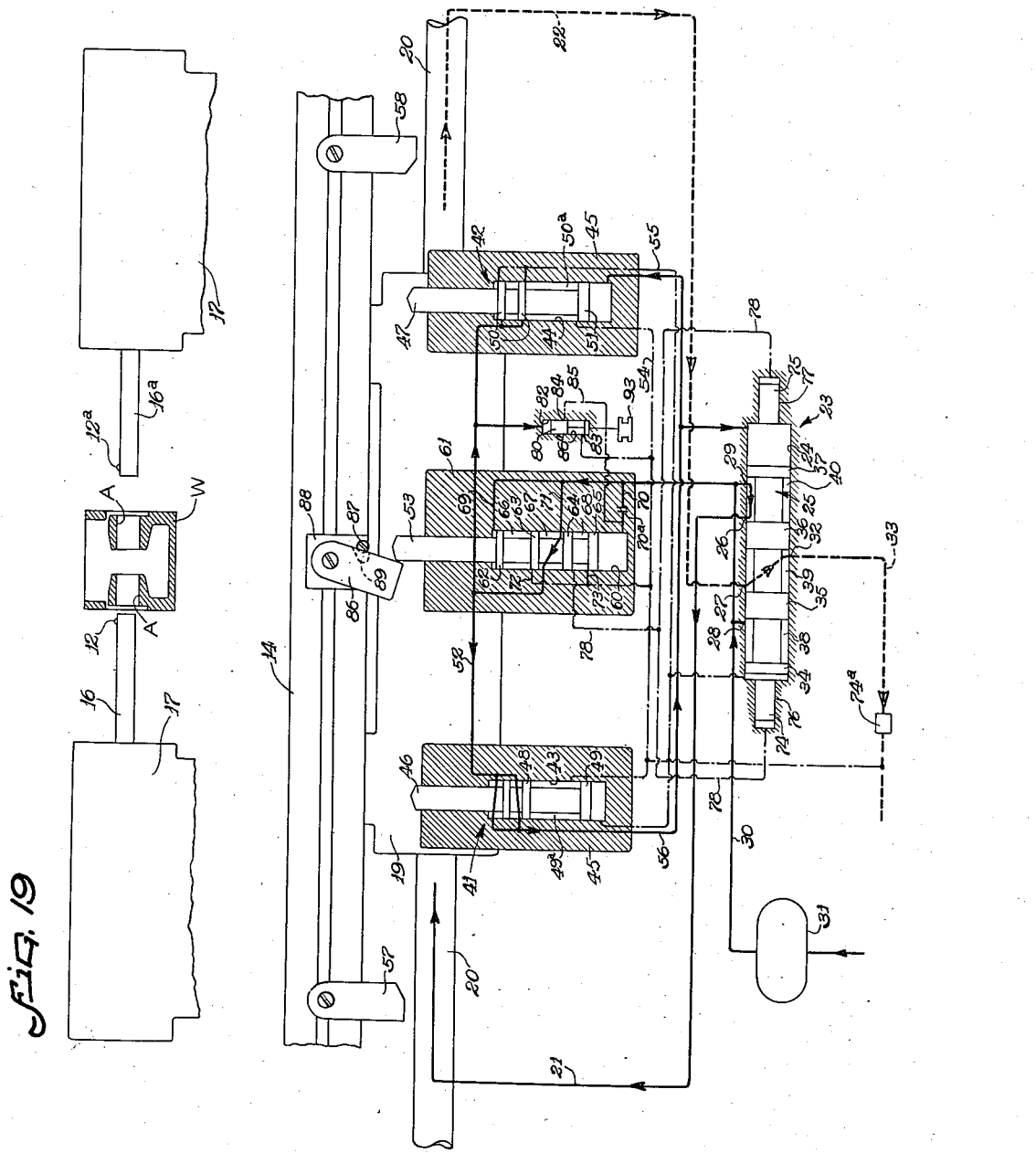

Patented Dec. 31, 1935

2,025,706

UNITED STATES PATENT OFFICE 2,025,706

MACHINE TOOL

Christian A. Birkebak, Detroit, Mich., assignor to Ex-Cell-O Aircraft & Tool Corporation, Detroit, Mich., a corporation of Michigan Application July 28, 1932, Serial No. 625,293

17 Claims. (Cl. 77—3)

The invention relates to improvements in machine tools and an important object of the invention is to provide such a tool having a movable tool or work support and a work clamping fixture, together with automatically controlled actuating means for the movable support and the clamping means of the fixture operable upon an initial manual actuation of a control means to clamp the work, actuate the movable support through a work performing cycle and stop the same upon completion of the cycle, and then unclamp the work.

Another object is to provide a machine tool having a movable support automatically actuated through a working cycle and a work clamping fixture having a controlling action upon the actuating means of the movable support.

Another object is to provide a machine tool with a movable support and a new and improved power operated work clamping device controlled in its unclamping operation by the movement of the support.

Another object is to provide a machine tool having a manually actuated member for starting operation of the machine together with a latch effective to prevent operation of the machine so as to require the operator to use both hands to start the machine and thereby prevent injury to the operator.

Another object is to provide a work fixture embodying a clamping device and a work positioning device operable to accurately locate a work piece prior to the operation of the clamping device and to maintain the work piece in this location until it has been clamped.

Another object is to provide a work locating device operable to position a work piece, the device being arranged to engage a surface which is to be operated upon by a tool, and adapted to be withdrawn from the work into a remote inoperative position.

Another object is to provide a machine tool embodying a work fixture with a guard extending from the fixture beyond the tool and cooperating with other parts of the machine frame to enclose the tool in all positions of the movable support, the fixture being arranged to permit insertion of the work laterally with respect to the path of movement of the support without exposing the tool or disturbing the guard.

Other objects and advantages will become apparent from the following description taken in connection with the accompanying drawings, in which:

Figure 1 is a front elevational view of a diamond boring machine embodying the features of the invention.

Fig. 2 is a plan view of the machine shown in Fig. 1.

Fig. 3 is a fragmental vertical sectional view taken along the line 3—3 of Fig. 2 and showing the work fixture in its closed relation with the work clamped therein.

Fig. 4 is a fragmental vertical sectional view showing one of the work clamps in its released position.

Fig. 6 is a fragmental horizontal sectional view taken substantially along the line 6—6 of Fig. 3 and showing the work-locating fingers in their active positions.

Fig. 7 is a fragmental view similar to Fig. 6 and showing the locating fingers in their withdrawn or inactive positions.

Fig. 8 is a fragmental perspective view of one set of locating fingers.

Fig. 9 is a fragmental vertical sectional view taken substantially along the line 9—9 of Fig. 2.

Fig. 10 is a fragmental vertical sectional view showing the details of the ejector pin trip mechanism, the view being taken substantially along the line 10—10 of Fig. 2.

Fig. 11 is a fragmental perspective view showing the cover of the work fixture in a partially open position and showing the ejector pin trip mechanism about to be released.

Fig. 14 is an enlarged vertical sectional view taken along the line 14—14 of Fig. 13 and showing the cam for controlling the operation of the cover of the fixture.

Figs. 15 and 16 are sectional views similar to Fig. 14 which show the cams for controlling the operation of the locating fingers and the clamps.

Fig. 17 is a sectional view taken along the line 17—17 of Fig. 13 and showing the switch operating cam.

Fig. 19 is a diagrammatic view of the hydraulic actuating and control circuits for the work table.

Figure 5:
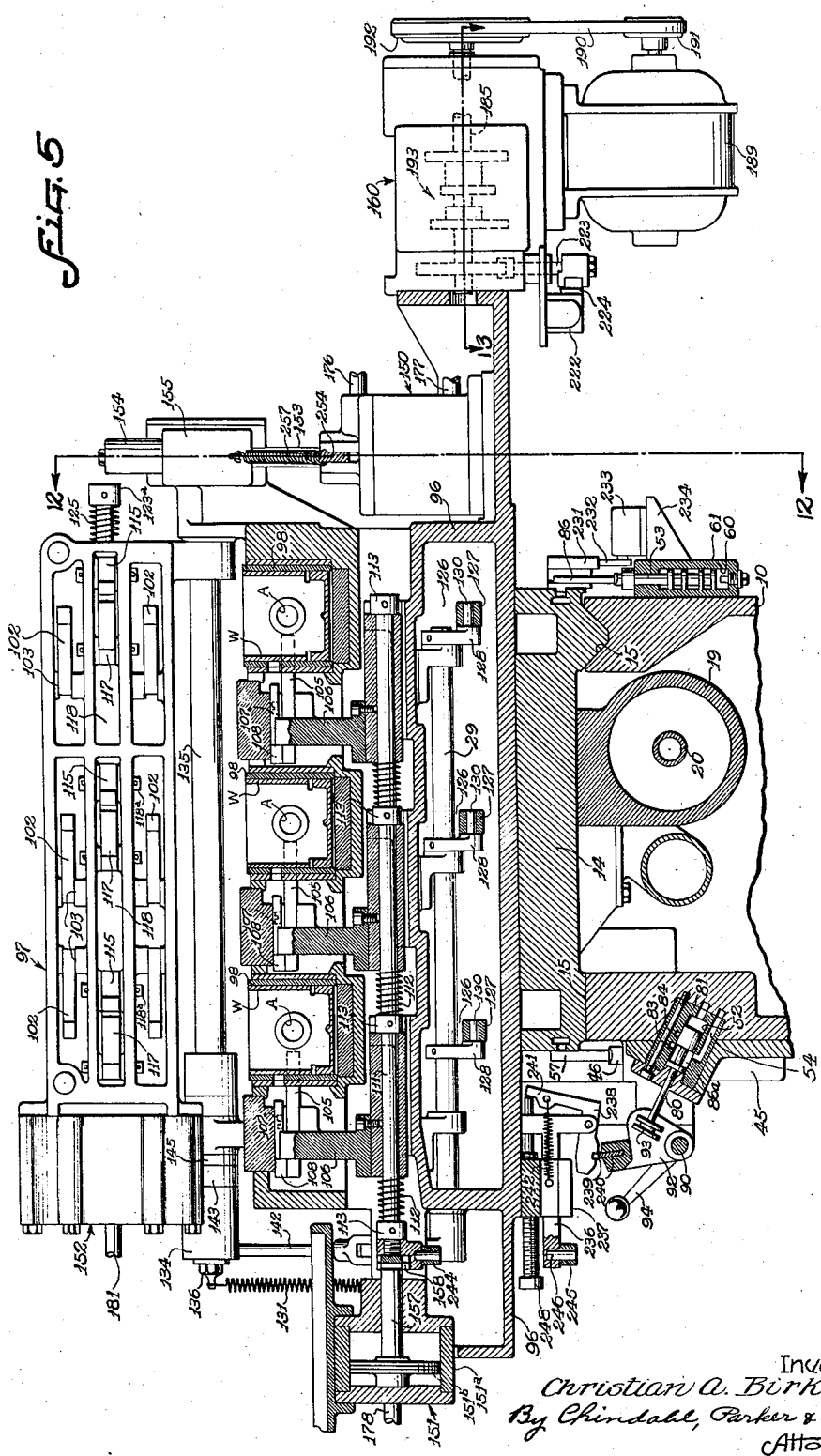
Fig. 5 is a fragmental vertical sectional view taken substantially along the line 5—5 of Fig. 2 and showing the work fixture with its cover in open position.

While my invention is susceptible of embodiment in many different forms, I have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

The machine in general

The preferred form of the invention is herein disclosed as embodied in a machine having an elongated bed 10 with bridge-like tool supports 11 adjustably mounted at opposite ends thereon. On the supports 11, a plurality of tools 12 and 12a are respectively mounted so that work carried in a fixture 13 on a longitudinally reciprocable table 14 may be moved into operative relation with the tools on either of the supports 11. The table 14 is of elongated form supported and guided on spaced longitudinally extending ways 15 (Fig. 5) on the bed 10, and in the form shown the ends of the table move beneath the bridge-like tool supports 11.

The invention is illustrated in connection with a diamond boring machine and the tools (Fig. 19) are diamond fly tools 12 and 12a carried by rotatable spindles 16 and 16a mounted on the supports 11, preferably with the spindles 16 and 16a in axial alinement so that the table 14 upon movement in opposite directions may bring the work into cooperative relation alternately with the tools 12 and 12a.

A machine of this character is especially useful in accurately boring the wrist pin holes of engine pistons, the ends of connecting rods or the hubs of gears. Accordingly, where roughing and finishing operations are to be performed, the tools 12 may be used as roughing tools and may be made of carboloy, while the tools 12a may constitute the finishing tools and are diamond fly tools.

In the present instance, three sets of axially alined spindles 16 and 16a (Fig. 2) are provided mounted in separate tool supporting structures 17 secured on the supports 11, and work pieces for one or more of the sets may be mounted in the fixture 13. In the present case, each set of tools is adapted to operate on an engine piston W (Figs. 4, 6 and 19) having two diametrically alined wrist pin holes A to be bored, and the piston W is mounted in the fixture 13 in the relation shown diagrammaticaly in Fig. 19. Movement of the table 14 to the left (Figs. 1 and 19) causes the tool 12 to take a roughing cut in both holes A, and reverse movement of the table causes the tool 12a to take a finishing cut in both holes, after which the work is returned to its centered position for removal from the fixture 13.

The spindle supporting structures 17 are all of similar construction and are adjustably secured by means of transverse T-slots upon the top bridge-like supports 11. Each structure 17 comprises a housing which encloses a driving motor and suitable spindle bearings (not shown).

The table actuating means

The table 14 is preferably actuated and controlled by automatic means providing for speed changes, direction reversal, and stopping of the table. This means may be of any preferred type and construction, but as herein shown, it is hydraulic in character substantially similar to that disclosed and claimed in a copending application by Carroll R. Alden, Serial No. 599,427 filed March 17, 1932. Since the speed change means employed is not related to the present invention, the disclosure herein has been simplified by eliminating the speed changing elements of the table-actuating and control means and confining the description to the starting, stopping and direction reversing elements thereof.

The hydraulic table-actuating motor may be of any preferred type such as a cylinder 19 (Figs. 3 and 5) fixed to and extending longitudinally beneath the table 14 and having therein a stationary piston (not shown) supported on the bed 10 by tubular piston rods 20 (Figs. 3 and 19) extending through the ends of the cylinder 19. Opposite ends of the cylinder 19 are connected, through their piston rods 20, to two fluid conduits 21 and 22 (Fig. 19) leading to a direction valve 23.

The direction valve 23 (Fig. 19) may be of any desired construction, and preferably comprises an elongated cylindrical bore 24 formed in a suitable valve casing and having closed ends. A valve piston 25 of the spool type is mounted for reciprocation in the bore 24. Formed in the peripheral wall of the valve bore 24 are two axially spaced ports 26 and 27 (diagrammatically shown in Fig. 19) connected respectively to the conduits 21 and 22. Two inlet ports 28 and 29, located respectively beyond the ports 26 and 27, also communicate with the valve bore 24 and are constantly connected through a pressure fluid supply conduit 30 to a suitable source of pressure fluid such as a low pressure pump 31. Intermediate the ports 28 and 29, an exhaust port 32 is formed communicating with an exhaust conduit 33. The valve piston 25 is formed with four longitudinally spaced peripheral collars or heads 34, 35, 36 and 37 defining peripheral spaces 38, 39 and 40 through which communication between various ports may be established.

It will be evident that upon movement of the valve piston 25 to the left (Fig. 19) the space 40 will connect the ports 26 and 29 to supply pressure fluid to the conduit 21 leading to the left end of the table cylinder, and the space 39 will connect the ports 27 and 32 and establish communication, through conduit 22, between the right end of the table cylinder 19 and the exhaust conduit 33, thus instituting movement of the table 14 to the left. Reversal of the position of the valve piston 25 similarly institutes movement of the table to the right.

An automatic reset pilot mechanism responsive to the movement of the table 14 is provided for reversing the direction valve 23. The pilot mechanism comprises two valves 41 and 42 for effecting reversal of the table respectively to the left and right. The valves 41 and 42 respectively comprise vertical valve bores 43 and 44 which may be formed in any suitable casings and which in the present instance are formed by valve plates 45 fixed on the front of the bed 10. Slidably disposed in the respective valve bores 43 and 44 are two valve plungers 46 and 47 of the spool-type formed respectively with upper and lower peripheral collars or heads 48 and 49, and 50 and 51 defining annular spaces 49a and 50a. The upper ends of the bores 43 and 44 are constantly in communication with a branched conduit 52 adapted to be connected through a stop valve 53 either to the source of pressure fluid or the exhaust.

The spaces 49a and 50a, regardless of the positions of the plungers 46 and 47, are always in communication with the drain through an exhaust conduit 54 which is controlled by the valve 53. A cross conduit 55 opens at one end to the bottom of the bore 43, and at the other end to the side of the bore 44 adjacent the top for connection through movement of the head 50 either with the supply conduit 52 or the exhaust conduit 54. Likewise, a cross conduit 56 opens at one end to the bottom of the bore 44 and at the other end to the side of the bore 43 adjacent the top thereof for communication through movement of the head 48 either with the supply conduit 52 or the exhaust conduit 54. The cross conduits 55 and 56 also open respectively to the left and right hand ends of the direction valve bore 24.

The bores 43 and 44 preferably open upwardly through the plates 45 and are closed at their lower ends, and the upper ends of the plungers 46 and 47 extend slidably from the upper ends of the valve bores. It will be evident that the lower ends of the plungers 46 and 47 constitute differential pistons which will assume their uppermost positions when subjected to fluid pressure at both ends. The exposed upper ends of the plungers 46 and 47 are beveled to constitute reversing abutments adapted for engagement by suitable control dogs 57 and 58 with inclined faces mounted on the front of the work table 14. The location and spacing of the dogs 57 and 58 on the table 14 is dependent upon the desired extent and range of reciprocation.

Assuming that the stop valve 53 is adjusted to connect the supply conduit 52 to the source of pressure fluid, and that the right hand plunger 47 is in its uppermost position, pressure fluid from the conduit 52 will be transmitted through the upper end of the valve bore 43 and the cross conduit 56 to the lower end of the valve bore 44 and also to the right hand end of the direction valve bore 24; and the lower end of the valve bore 43 and the left end of the direction valve bore 44 will be connected through the cross conduit 55 and the space 49ª to the exhaust conduit 54 and thence to the drain 33. Hence, the plunger 46 will occupy its lowermost position, and the direction valve piston 25 will be moved to the left to cause the table 14 to travel to the left.

As the table 14 reaches its extreme left position, the dog 58 depresses the plunger 47, thereby breaking the exhaust connection from the lower end of the valve bore 44 and establishing a connection therefrom to the pressure conduit 52. Thereupon the plunger 46 is elevated into operative position, thereby breaking the pressure connection to the lower end of the bore 44 and the right hand end of the direction valve bore 24, and establishing a connection therefrom to the exhaust. As a result, the direction valve piston 25 is moved to the right to reverse the movement of the table 14. Upon movement of the table 14 to its extreme right position, the dog 57 depresses the plunger 46, thereby reestablishing the initial connections and resetting the plunger 47 in its uppermost position.

The stop valve 53 (Figs. 5 and 19) is operable either automatically or manually to interrupt the translation of the work table 14, and in its preferred form comprises a valve bore or chamber 60 vertically positioned and formed in a plate 61 which may be fixed on the rear side of the bed 10, the bore 60 being closed at the bottom and being open at its upper end to permit the upper end of the valve plunger 53 to project therefrom. The valve plunger 53 is of the spool-type and is reciprocably disposed in the bore 60. On the plunger 53 are four longitudinally spaced peripheral collars or heads 62, 63, 64 and 65 which define annular spaces 66, 67 and 68. The plunger 53 thus constitutes a differential piston which when subjected at both ends to the same pressure tends to assume its uppermost position.

The supply conduit 30 is connected through three parallel branch conduits 69, 70, and 71 to the bore 60 respectvely at the upper and lower ends and at an intermediate point. Interposed in the lower branch conduit 70 is a restricted orifice 70ª. The exhaust conduit 54 is connected through two parallel branch conduits 72 and 73 to the bore 60 at spaced points intermediate the conduits 69, 70 and 71. A back pressure valve 74ª is interposed in the discharge end of the system ahead of the exhaust conduit 54 and back of the direction valve 23. The pressure conduit 52 for the pilot reset valves 41 and 42 is connected to the bore 60 at a point such that when the plunger 53 is in its uppermost position, communication will be established therewith through the space 67 to the main supply conduit 30, and when the plunger is partially depressed, such communication will be cut off. Obviously, fully lowering the plunger 53 will connect the conduit 52 through the space 66 with the exhaust conduit 54, and will therefore cause the ends of the main valve 23 to be connected with the drain conduit 33.

Pressure responsive means is provided for automatically centering the valve piston 25 when the occasion arises. This means comprises two centering pins 74 and 75 slidably disposed respectively in bores 76 and 77 alined with and at opposite ends of the bore 44 and adapted to engage the ends of the direction valve piston 25 when urged inwardly. The outer ends of the bores 76 and 77 are connected to a branched conduit 78 which opens to the bore 60 above the conduit 73 and at such a point that it will communicate through the space 68 with the exhaust conduit 54 when the plunger 53 is elevated, and through the space 67 with the supply conduit 30 when the plunger 53 is depressed. It will be evident that when the stop valve plunger 53 is depressed to connect both ends of the main valve bore 24 to the exhaust conduit 54, and simultaneously to connect the conduit 78 to the supply conduit 30, the impressed pressure fluid in the bores 76 and 77 will force the centering pistons 74 and 75 into their innermost positions, thus causing self-centering of the main valve piston 25 to interrupt the conduit connections to the table cylinder 19.

Downward movement of the stop plunger 53 may be effected at will by means of a manual control which in the present instance consists of a valve 80 (Figs. 1, 3, 5 and 19). Preferably the valve 80 comprises a casing 81 fitted in a recess in the front of the bed 10 and having an axial valve bore 82. The bore 82 is connected at its inner end to the pressure conduit 52, and is formed at points spaced along its length with annular ports 83 and 84 connected respectively to the exhaust conduit 33 and a conduit 85 opening into the lower end of the bore 60 beneath the stop valve plunger 53. The valve 80 is slidably mounted in the bore 82 with its stem projecting forwardly from the base. Within the bore 82, the valve plunger 80 is formed with a peripheral space 86ª adapted either to connect or disconnect the conduits 85 and 33. Obviously upon actuating the valve 80 to connect the conduits 85 and 33, the lower end of the bore 60 will be opened to the exhaust, and due to the orifice 70ª, a substantial pressure reduction will occur beneath the stop plunger 53, thereby causing the latter to descend to stop the work table 14. Upon actuating the valve 80 in the opposite direction, the pressure fluid will again be admitted to the underside of the stop valve plunger 53 thus causing the latter to return upwardly to its operative position and thereby instituting movement of the table as determined by the setting of the direction valve 23.

Where a roughing cut and a finishing cut are to be taken upon movement of the work table 14 in opposite directions, it is desirable to provide means for automatically stopping the table upon movement thereof after the finishing cut into a central or neutral position. This means (Figs. 5 and 19) comprises a pivotal drop pawl or dog 86 movable with the work table 14 and adapted to engage the upper beveled end of the stop plunger 53. The dog 86 is pivotally mounted on the rear edge of the table 14 and a forwardly projecting pin 87 carried on a mounting plate 88 is adapted for engagement in a slot 89 formed in one side of the dog 86 to limit pivotal movement of the dog in one direction.

In movement of the table 14 to the right, (Fig. 19), the dog 86 pivots away from the pin 87 upon contact with the plunger 53 so that the plunger is not depressed by such engagement, but upon movement of the table 14 to the left into the neutral or loading position, the dog will pivot toward the pin 87 and will thus be effective to depress the stop plunger. The stop plunger 53 is not depressed into its lowermost position or sufficiently to release the dog 86, although the slight pivotal movement permitted by the pin 87 causes the center of gravity of the dog 86 to be located to the right (Fig. 19) of the pivotal center of the dog. To again institute operation of the table 14, as for a succeeding cycle, the control valve 80 is actuated, either manually or automatically, to connect the conduits 85 and 33, thereby causing the plunger 53 to drop to its lowermost position. The dog 86 is thereby released and drops to the left (Fig. 19) so as to clear the path for proper movement of the stop plunger 53. The stop plunger 53 however remains in its lowermost or table-setting position until the control valve 80 is again withdrawn to its outermost position, whereupon the increased pressure in the lower end of the valve bore 60 elevates the plunger 53 and permits the feeding of the table 14 to the left as determined by the position of the direction valve 23.

To provide for convenient manual actuation of the control plunger 80, a horizontal rock shaft 90 is mounted in brackets 91 on the forward side of the bed 10 and a lever 92 fixed on the rock shaft 90 intermediate its ends has an eccentrically located pin thereon (not shown) engaging a grooved head 93 on the valve plunger 80. At its ends, the rock shaft 90 carries hand levers 94 for manually actuating the shaft.

*The work fixture in general*

The machine is preferably arranged so that the work is inserted into the fixture 13 laterally with respect to the path of movement of the table 14, in the present instance, from the top of the fixture. With such an arrangement, the distance between the tools 12 and 12ª may be but slightly greater than the width of the work (Fig. 19) whereby to reduce the length of the stroke required for the table 14. It also permits the mounting of guards 95 (Figs. 1, 2, 9 and 12) on the sides of the fixture 13 so as to extend along the tool spindles 16 and 16ª to completely cover and guard the spindles and tools in all positions of the table. The guards 95 in the present case extend over the tops of the spindle mounting structures 17 and are of course optional.

The work fixture 13 comprises a hollow base section 96 fixed on the table 14 and recessed from the top to receive three work pieces such as pistons W, one between each of the three alined pairs of tools 12 and 12ª, and a movable section or cover 97 on the base section 96 shiftable about a horizontal pivotal axis to close the top of the recesses. While the cover 97 is in its open position (Figs. 5 and 12), the pistons W are inserted into sockets or seats provided by sleeves 98 and bottom plates 99 mounted within the base 96, and the bearings A of the pistons W are approximately alined with the tools 12 and 12ª and with openings 100 and 101 formed in the sides of the hollow base 96 and in the sleeves 98.

The cover 97 is then closed to bring pivoted clamping bars 102 carried thereby into contact with the uppermost edges of the skirts of the pistons W. Two such clamping bars 102 are provided for each of the pistons W (Figs. 5 and 9). Each bar 102 is pivoted at 103 on a horizontal axis and is yieldingly pressed toward the work pieces by springs 104, (Fig. 9). Thus, the pistons W are clamped by a yielding pressure against the bottom plate 99, the vertical position of the pistons being accurately determined by upstanding pins 99ª on the bottom plate and engaging the closed ends of the pistons.

While thus clamped, the pistons W may be rotated about a vertical axis to bring the bearings A into accurate alinement with the tools, and such rotation of the pistons is accomplished by shiftable locating fingers 105. Two such locating fingers 105 are provided for each piston W, and they preferably are adapted to act upon the internal surfaces of the bearings A. In operation, the two locating fingers 105 are moved axially into the bearings A, and are then moved transversely of the longitudinal axis of the bearings until both locating fingers are in contact with corresponding internal surfaces of the bearings. The operative contact surfaces or ends 105ª of the two locating fingers of each pair are maintained at all times in a parallel relation to the tools 12 and 12ª so that such movement of the fingers into contact with the corresponding internal surfaces of the bearings A serves to rotate the piston W into the desired angular relation to the tools.

In the present case, the locating fingers 105 of each pair bear a scissors-like relation to each other to provide for movement of the ends 105ª thereof into the bearings A, and are carried on a slide block 106 (see Figs. 6 to 8) mounted for horizontal movement in the base 96 transversely of the axis of the tools. Intermediate their ends, the locating fingers 105 are pivoted at 107 on vertical axes on the slide block 106. By movement of the locating fingers about the pivots 107, the ends 105ª may be moved toward and away from each other so as to permit the fingers to be moved into the bearings A of the pistons. Such pivotal movement of the locating fingers 105 is obtained automatically in the reciprocatory movement of the slide block 106 by means of cam rollers 108 mounted on the other ends of the locating fingers 105, and engaging cam grooves 109 formed in blocks 110 secured in the base 96 (Fig. 6). As will be evident from a comparison of Figs. 6 and 7, movement of the slide block 106 from the position shown in Fig. 7 to the position shown in Fig. 6 moves the rollers 108 through angular portions 109a of the cam grooves 109 so as to pivot the fingers 105 and shift the ends 105a thereof toward each other and into the bearings A. Continued movement engages the ends 105a with the sides of the bearings A and accurately alines the same with the tools. In the withdrawing movement, the locating fingers 105 are separated so as to avoid shifting or displacement of the pistons W.

Extending slidably through all three of the slide blocks 106 is a longitudinally shiftable horizontal rod 111 (Figs. 5 and 6 to 9) through which the three sets of locating fingers 105 are actuated in unison. Movement of the rod 111 tending to shift the locating fingers 105 to their active positions is transmitted yieldingly to the slide blocks 106 by coil springs 112 surrounding the rod and acting between the blocks 106 and collars 113 fixed on the rod. In the reverse movement of the rod 111, the slide blocks 106 are shifted positively by engagement with the collars 113.

While held in accurately determined positions by the locating fingers 105, the pistons W are secured in place by clamps 115, which preferably comprise clamping levers 116 and 117 (Fig. 4) carried by the cover 97 and extending downwardly within the skirts of the pistons W. Each lever 116 is pivoted at 118a intermediate its ends in a slot 118 formed in the cover 97 so that one end 116a projects downwardly into the skirt of the piston W and constitutes the clamping end while the other end 116b extends upwardly through the cover and constitutes the actuating end. The lever 117 is also pivoted in the slot 118 and extends from the cover into the piston W. Movement of the lever 117 is obtained by means of a yieldable lost motion connection 119 between the lever 117 and an arm 120 on the lever 116.

Mounted on the outside of the cover 97 in bearings 122 for longitudinal sliding movement from front to rear of the fixture is a rod 121 (Figs. 2 and 3) for simultaneously actuating the three clamps 115. The ends 116b of the clamp levers 116 are bifurcated so as to straddle the rod 121 between sets of two fixed collars 123 and 123a. The collars 123 engage the levers 116 and in the rearward movement of the rod 121 serve to effect positive release of the clamps. In the opposite, or clamping movement of the rod, actuation of the clamps is yieldable in character by reason of springs 125 coiled about the rod and acting between fixed collars 123a and the collars 124 which are slidable on the rod 121.

After the work upon the pistons W has been completed, and the clamps 115 released and the cover 97 opened, the pistons are moved upwardly in the sleeves 98 by work ejector pins 126 (Fig. 9), two of which may be moved upwardly through suitable openings in each of the bottom plates 99. The work ejecting pins 126 of each pair are mounted on a block 127, and the blocks 127 are actuated in unison through pin and slot connections 130 by arms 128 fixed on a rock shaft 129. The ejector pins 126 are normally withdrawn downwardly into inoperative position by a spring 131 acting between a stationary part of the structure and an arm 132 (Figs. 1 and 9) fixed on the forward end of the shaft 129.

In the present embodiment, the ejector pins 126 are actuated as an incident to the opening movement of the cover 97, such actuation being obtained through a ratchet connection which releases the pins for retractive movement by the spring 131 after the pistons W have been raised an appreciable distance in the sleeves 98. Thus any binding action between the pistons W and the sleeves 98 is overcome so that the pistons may be easily removed, and the pins 126 are retracted to permit insertion of new work pieces.

The ratchet connection between the cover 97 and the ejector pins 126 includes an arm 133 (Figs. 1, 2, 3, 5, 9, 10, 11 and 18) formed with a hub 134 at one end, the hub being rotatably mounted on the forward end of a rock shaft 135 journaled in the base section 96 and upon which the cover 97 is fixed. A bolt 136, upon which the spring 131 is anchored, serves to hold the hub 134 in place on the shaft 135. Pivoted intermediate its ends at 137 in a lug 138 on the cover 97 is a lever or pawl 139 which extends lengthwise of the shaft 135 so that its forward end is positioned beside the hub 134. A spring 140 acting between the shaft 135 and the other end of the pawl 139 presses the forward end of the pawl against the hub 134 so that it will engage a radially projecting lug or tooth 141 formed on the hub. Thus, in rotation of the shaft 135 to open the cover 97, the pawl 139 engages the tooth 141 and rotates the hub 134 and its associated arm 133, which through a link 142, connected to the arm 132, actuates the ejector pins 126.

A guide member 143 fixed to the shaft 135 adjacent to the hub 134 has a radial slot 144 therein which embraces and guides the pawl 139 for movement radially out of engagement with the tooth 141. Such disengagement of the pawl 139 is caused by a stationary cam plate 145 (Figs. 10 and 11) fixed on the base section 96 and loosely surrounding the shaft 135 just rearwardly of the guide member 143. The cam plate 145 provides a cam surface 146 with which the forward portion of the pawl 139 engages in the opening movement of the cover 97. The slope of the cam surface 146 is such that the pawl 139 is disengaged from the tooth 141 just prior to the completion of the cover-opening movement. The spring 131 then causes reverse rotation of the arms 132 and 133 so as to withdraw the ejector pins 126 and return the arm 133 to the position shown in Fig. 1. In this position of the arm 133, the pawl 139 is positioned radially outwardly of a surface 147 (Fig. 11) formed on the tooth 141 concentric with the shaft 135 so that the pawl may bear against the surface 147 in the return or closing movement of the cover 97. Just before the closing movement of the cover is completed the pawl 139 passes the end of the surface 147 and is forced inwardly against the hub 134 in position to engage the tooth 141 in the subsequent opening of the cover.

*The fixture actuating means*

The cover 97 with its associated clamp bars 102 and the ejector pins 126, the locating fingers 105 and the clamps 115 are preferably actuated in predetermined sequence by automatically operating power means. The actuating means may be of any preferred construction but in the present case it is hydraulic in character and comprises three double-acting piston and cylinder devices 150, 151 and 152 connected respectively to the cover 97, the locating fingers 105 and the clamps 115.

The piston and cylinder device 150 (Figs. 1, 2, 3, 5, 12 and 18) which operates the cover 97, the clamping bars 102 carried by the cover and the ejector pins 126, is mounted at the rear end of the base 96 of the fixture, and comprises a stationary vertically positioned cylinder 150a having a movable piston 150b therein with an associated vertical piston rod 153 extending upwardly through the top end wall of the cylinder 150ª. On its projecting end, the piston rod 153 carries a rack 154 mounted for sliding movement in a guide 155 which holds the rack in engagement with a pinion 156. The pinion 156 is keyed to the horizontal rock shaft 135 upon which the cover 97 is fixed. Thus rocking movement of the shaft 135 through the medium of the piston and cylinder device 150 serves to open or close the cover 97, and, as an incident to such movement to actuate the clamping bars 102 and the ejector pins 126.

The piston and cylinder device 151 (Figs. 1, 3, 5, 6, 7 and 18) for actuating the locating fingers 105 is positioned at the forward end of the fixture 13 and comprises a stationary cylinder 151ª fixed in a horizontal position on the base section 96 in alinement with the actuating rod 111 of the locating fingers. Within the cylinder 151ª is a slidable piston 151ᵇ with an associated piston rod 157 connected at 158 to the rod 111 for reciprocating the same.

The piston and cylinder device 152 (Figs. 1 to 5 and 18) for actuating the clamps 115 is carried by the cover 97 and comprises a cylinder 152ª fixed on the forward end of the cover. Within the cylinder 152ª is a slidable piston 152ᵇ attached to the rod 121. Thus, the rod 121 may be reciprocated by the piston and cylinder device 152 to actuate the clamps 115.

*The interrelated automatic control of the fixture and the table*

The various elements of the work fixture are preferably operated in predetermined timed sequence by suitable control means, and in the present embodiment of the invention the operation of the work fixture control means is interrelated with the table 14 and the table control means to provide for a fully automatic manually initiated cycle of operation. Thus, an initial manual actuation of a control element after the work pieces W have been placed in the fixture causes an automatic operation of the machine, in which operation the cover of the fixture is closed, the work accurately located and clamped, the table moved through its automatic work performing cycle and the cover opened and the work unclamped and ejected after the table movement has been automatically terminated.

Figure 13:
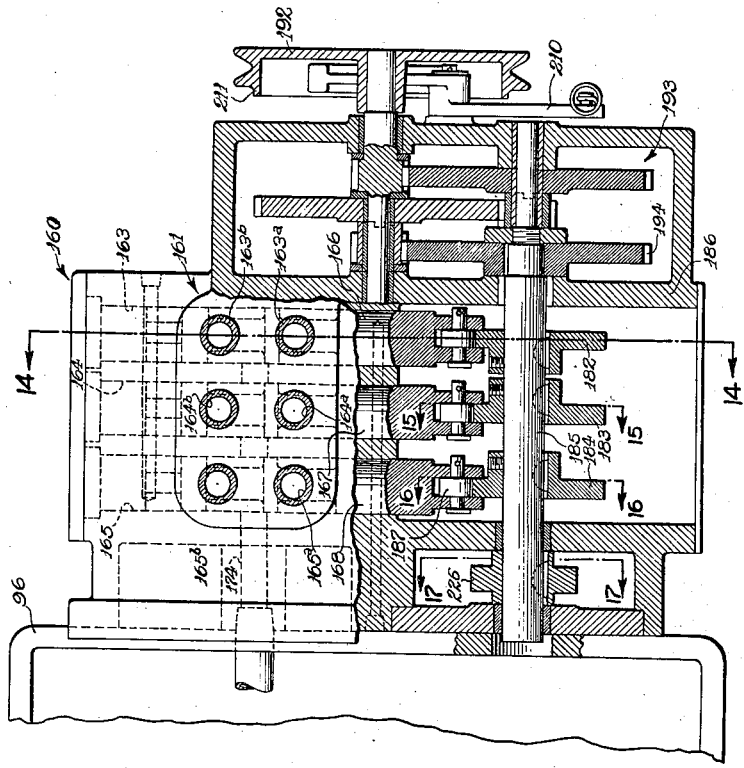
Fig. 13 is a fragmental horizontal sectional view taken substantially along the line 13—13 of Fig. 5 and showing the control mechanism.

With this end in view, a control device 160 (Figs. 2, 3, 5, 13 and 18) is mounted on the rear end of the base 96 of the work fixture. The control device 160 comprises a six-way valve 161 (Figs. 2, 13 and 14) for controlling the passage of pressure fluid to and from the three piston and cylinder devices 150, 151 and 152. The valve 161 comprises a casing 162 with three parallel bores 163, 164 and 165 and valve members 166, 167 and 168 of the spool-type reciprocable therein. Each of the three valve members has three spaced heads 169, 170 and 171 defining peripheral spaces 172 and 173. In one position, the space 172 communicates with a pressure inlet port 174 formed in the casing 162, while the space 173 communicates with one of two ports 175 of a branched exhaust passage 175ª. The pressure inlet port 174 may be supplied with pressure fluid from the supply pump 31 of the table actuating means. Each of the valve bores 163, 164 and 165 has a pair of longitudinally spaced ports similar to ports 163ª and 163ᵇ of the valve bore 163. The port 163ª is constantly in communication with the space 173 while the port 163ᵇ is constantly in communication with the space 172 so that reversal of the position of the valve member 166 reverses the pressure and exhaust connections to the ports 163ª and 163ᵇ.

Figure 18:
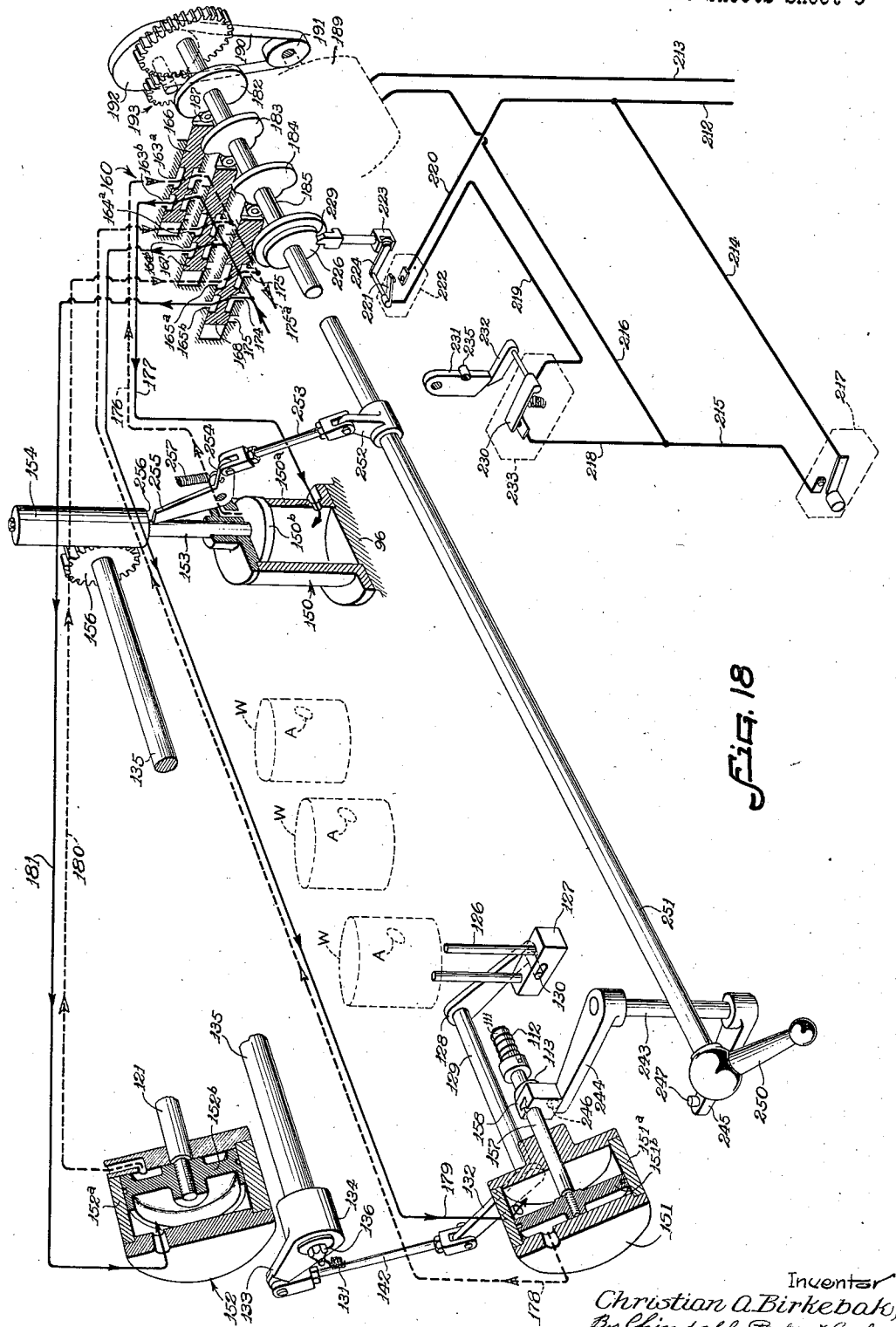
Fig. 18 is a diagrammatic view of the actuating and control mechanism of the work fixture.

As shown in Fig. 18, the port 163ª is connected by a conduit 176 to the upper end of the cylinder 150ª while the port 163ᵇ is connected by a conduit 177 to the lower end of the cylinder. Similar conduits 178 and 179 connect ports 164ª and 164ᵇ respectively with the forward and rear ends of the cylinder 151ª which is employed to actuate the locating fingers 105. Conduits 180 and 181 communicating with ports 165ª and 165ᵇ are connected respectively to the rear and front ends of the cylinder 152ª which actuates the clamps 115.

The valve members 166, 167 and 168 are actuated in predetermined timed sequence by means comprising a plurality of disk cams 182, 183 and 184 fixed on a rotatable control or cam shaft 185 mounted in a horizontal position within a housing 186 which constitutes a continuation of the valve casing 162. The valve members 166, 167 and 168 have rollers 187 thereon adapted to engage the corresponding cam disks. The rollers are held in engagement with the cam disks by expansive springs 188 mounted in the valve casing 162 and acting against the valve members. The control shaft 185 is preferably actuated by an electric motor 189 through a belt 190 and pulleys 191 and 192 connected to an enclosed speed reducing gear train 193 (Fig. 13), the terminal gear 194 of which is fixed on the control shaft 185.

The cams 182, 183 and 184 are so related and proportioned that in rotation of the control shaft 185 through substantially 270° in a counterclockwise direction from the positions shown in Figs. 14 to 16, the operative elements of the work fixture are caused to move through a work clamping cycle, while rotation of the control shaft through an additional 90° back to the position of Figs. 14 to 16 causes the unclamping operation of the elements of the fixture.

When the control shaft 185 is in the position of Figs. 14 to 17, the rollers 187 of the three valve members 166, 167 and 168 engage concentric dwell surfaces 195, 196 and 197 formed respectively on the cams 182, 183 and 184, such engagement being at points indicated by the letter B in Figs. 14, 15 and 16. When in this relation to their cams, the valve members are moved by the springs 188 to the left as shown in Fig. 14, so as to connect the spaces 172 with the pressure fluid inlet ports 174 and the spaces 173 with the exhaust ports 175. The cover 97 is therefore in its open position, the clamps 115 in their unclamped relation, and the locating fingers 105 in the withdrawn relation of Fig. 7.

Upon initiation of the clamping cycle of the control shaft 185, the rollers 187 of the valves 167 and 168 continue to bear against the concentric dwell surfaces 196 and 197 (Figs. 15 and 16) while a leading surface 198 on the cam 182 moves into contact with the associated roller 187 and shifts the valve 166 to the right as shown in Fig. 14. This reverses the position of the valve 166 and hence reverses the pressure and exhaust connections to the cover actuating piston and cylinder device 150 so as to cause closing movement of the cover 97.

When the rotative movement of the control shaft 185 has engaged the various cams with their rollers at points C, the clamping movement of the cover 97 has been completed and the roller 187 of the valve 166 is engaged with a concentric dwell surface 199 which maintains the valve 166 in its reversed right hand position (Fig. 14) so that the cover 97 is held in its closed position. In continued rotative movement of the control shaft 185 to bring the points D of the cams into contact with the various rollers 187, the positions of the valves 166 and 168 remain unchanged since their rollers 187 bear against the concentric dwell surfaces 199 and 197. The valve 167 however, is reversed during such movement of the control shaft by a leading surface 200 formed on the cam 183 intermediate the points C and D. Hence the locating fingers 105 are moved to their active positions of Fig. 6. At the point D (Fig. 15) the leading surface 200 on the cam 183 merges with a concentric dwell surface 201 which, during continued rotation of the shaft 185, maintains the valve 167 in its right hand position so as to cause the positioning fingers to remain in their active relation to the work.

While the dwell surfaces 199 and 201 maintain the valves 166 and 167 in their right hand positions, continued rotation of the control shaft 165 brings a leading surface 203 on the cam 184 (Fig. 16) into contact with the associated roller 187 so as to reverse the position of the valve 168 and cause movement of the clamps 115 to their active work-clamping positions. The roller 187 of the valve 168 then engages a dwell surface 204 at the point E and maintains the valve 168 in its reversed position.

As the control shaft E continues to rotate a receding surface 205, formed on the cam 183 (Fig. 15) between the points E and F and connecting the dwell surfaces 196 and 201, permits the valve 167 to be returned to its left hand position by the associated spring 188 so as to restore the original pressure and exhaust connections to the piston and cylinder device 151 and thereby cause withdrawal of the locating fingers 105. During such withdrawal of the locating fingers the valves 166 and 168 are held in their reversed positions by the dwell surfaces 199 and 204 so as to maintain the cover 97 in its closed position and the clamps 115 in their active relation to the work. When the cams have been rotated by the control shaft 185 so as to engage the rollers 187 at the points G, the clamping cycle of the fixture has been completed and the rotation of the control shaft is stopped.

In the unclamping cycle of the control shaft 185, the dwell surface 199 on the cam 182 holds the valve 166 in its reversed or right hand position while a receding surface 207, formed on the cam 184 intermediate the points G and H and connecting the dwell surfaces 197 and 204, permits the valve 168 to resume its original position and thereby cause releasing movement of the clamps 115. A receding surface 208 formed on the cam 182 between the points H and B then permits the valve 166 to move to the left and cause opening of the cover 97 and actuation of the ejector pins 126.

Rotation of the control shaft 185 is started and stopped by making and breaking an electric circuit to the motor 189, and over-running of the shaft 185 is prevented by a spring actuated brake lever 210 (Fig. 13) bearing against the internal surface of a flange 211 formed on the pulley 192.

In the present embodiment, power is supplied to the motor 189 from power lines 212 and 213. The power line 213 is connected directly to the motor while the power line 212 has two parallel control circuits interposed therein. One of these parallel circuits constitutes a starting circuit for the motor and includes conductors 214, 215 and 216 with a normally open switch 217 therein. The switch 217 is of the push button type, and is mounted on the forward face of the right hand tool support 11. The other of the two parallel circuits in the line 212 comprises the conductor 216, and conductors 218, 219 and 220, and constitutes a running circuit for the motor. In the running circuit, is a switch 221 mounted in a suitable box 222 on the control device 160 (Figs. 3, 17 and 18). The switch 221 is actuated by a vertically movable plunger 223 (Fig. 17) connected to an actuating arm 224 of the switch. A spring 225 surrounding the plunger tends to urge the switch 221 into its open position, and to maintain the plunger in contact with a cam disk 226 operable by the control shaft 185. When the control shaft 185 is in the position shown in Figs. 14 to 18, the plunger 223 is positioned with its upper end in a notch 227 in the cam 226 so that switch 221 is open. When the work clamping cycle of the control shaft 185 is initiated by closing the starting switch 217, the cam 226 is rotated and a leading surface 228 thereon engages the plunger 223 to compress the spring 225 and thereby close the switch 221. A concentric dwell surface 229 on the cam 226 is then moved into contact with the end of the plunger 223 to maintain the switch in its closed position.

Figure 12:
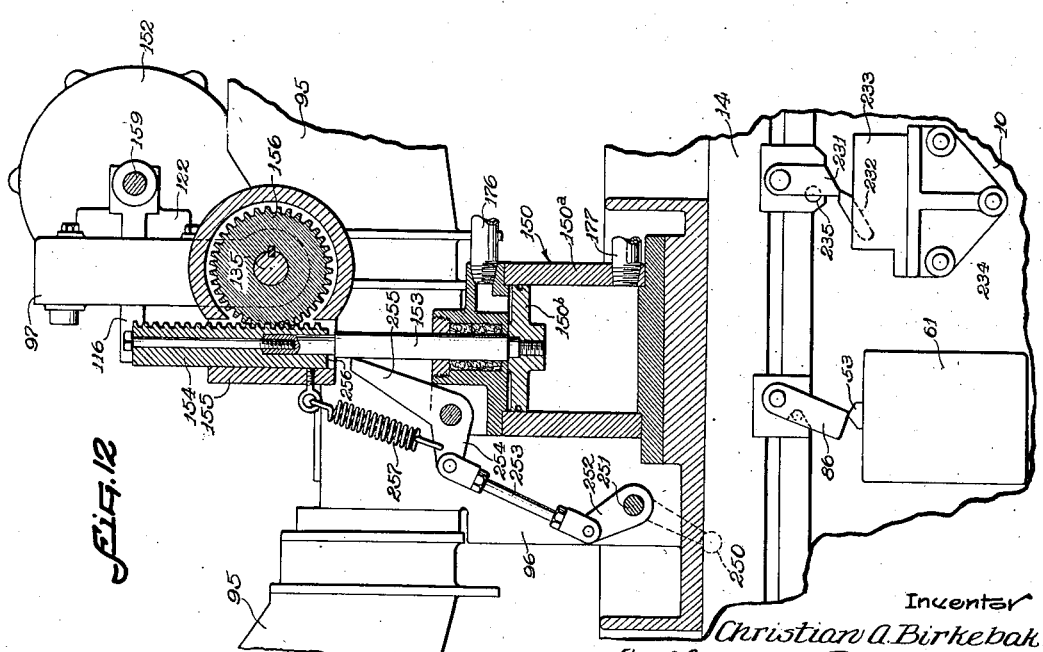
Fig. 12 is a fragmental vertical sectional view taken substantially along the line 12—12 of Fig. 5.

To break the running circuit of the motor and thereby stop rotation of the control shaft 185 upon completion of its clamping cycle, a second switch 230 is provided between the conductors 218 and 219. The switch 230 is automatically controlled by movement of the table 14, a pivoted dog 231 (Figs. 3, 5, 12 and 18) being mounted on the rear edge of the table to engage a pivoted operating arm 232 of the switch 230. The arm 232 is located outside of a box 233 which encloses the switch 230 and is mounted on a fixed bracket 234 carried on the rear side of the bed 10 as shown in Figs. 3 and 12. The switch 230 is spring pressed in a conventional manner (not shown) toward a normal open position which tends to raise the end of the arm 232 into the path of the dog 231. When the table 14 is in its central or loading position (Figs. 1 and 12) as determined by the stop dog 86, the dog 231 engages the switch operating arm 232 and holds the switch 230 closed so that closure of the other switch 221 serves to complete the running circuit to the motor 189. Upon movement of the table 14 and the associated dog 231, the arm 232 is released and the switch 230 opens, thereby causing the control shaft 185 to stop. When the roughing operation has been completed and the table returns and passes its central position, the dog 231 engages the lever 232 and is pivoted away from a stop pin 235 so as to be ineffective as a switch closing means. After the finishing operation has been completed, the table returns to its central position from the opposite direction and the dog 231 engages the switch operating arm 232 and is moved into contact with the stop pin 235. The dog 231 therefore serves to depress the lever arm 232 and closes the switch 230. The running circuit to the motor is thereby reestablished and the control shaft moves through its unclamping cycle which is terminated by movement of the switch plunger 223 into the notch 227 in the cam disk 226.

In order that the switch 230 may be opened and the clamping cycle terminated at the proper point in the rotation of the control shaft 185, the initiation of the table movement preferably is governed by the control shaft 185. This end is attained by means acting on the manual table control plunger 80 and including the piston and cylinder device 151 which actuates the locating fingers 105. Accordingly, a slide 236 is mounted in a guide 237 on the underside of the projecting forward end of the base 96 of the fixture for horizontal movement toward and away from the forward face of the bed 10. The slide 236 is positioned directly above the arm 92 which actuates the table control plunger 80. A pivoted latch 238 mounted on the slide has a downwardly facing notch 239 adapted to engage a tooth 240 fixed on the arm 92. Between the guide 237 and an upwardly projecting arm 241 on the latch 238, a spring 242 acts to pivot the latch 238 downwardly into engagement with the tooth 240.

The slide 236 is reciprocated by a bell crank device mounted in the base 97 of the fixture and acting between the slide and the piston and cylinder device 151. As shown in Fig. 18, the bell crank device comprises a vertical shaft 243 rotatably mounted in the base section 95 at one side of the slide 236 and having laterally projecting arms 244 and 245 fixed at its upper and lower ends. The arms 244 and 245 have pin and slot connections 246 and 247 respectively with the connector 158 and the slide 236.

When the piston and cylinder device 151 is actuated rearwardly to move the locating fingers into their active positions, the latch 238 rides over the top of the tooth 240 until the notch 236 engages the tooth. Continued rearward movement of the slide 236 causes the lever 92 to be rocked rearwardly from the position of Fig. 5 to that of Fig. 3 and the table control plunger 80 depressed. This releases the dog 86 (Fig. 12), but the stop plunger 53 remains in its depressed or table stopping position due to the reduced pressure at its lower end caused by the connection of the ports 83 and 84. When the piston and cylinder device 151 is reversed to withdraw the locating fingers 105, the control plunger 80 is also withdrawn from the position shown in Fig. 3 to the position shown in Fig. 5 so as to institute the automatic cycle of table movement. Such movement of the table 14 shifts the dog 231 from its position above the switch arm 232 so that the switch 230 opens and terminates the clamping cycle of the control shaft 185. It will be noted that the control plunger 80 is maintained in its depressed position by the latch 238 throughout substantially the entire clamping cycle of the fixture and during such time it is impossible for the operator to institute movement of the table.

Preferably the latch 238 is disengaged from the arm 92 after the control plunger 80 has been withdrawn so as to permit use of the control plunger 80 for manually stopping the movement of the table 14. This end is accomplished by an adjustable screw 248 mounted in the guide 237 and providing an abutment lying in the path of the arm 241 in its forward movement.

Injury to the operator is prevented by a safety trip mechanism which requires actuation simultaneously with the starting switch 217 in order to initiate operation of the machine, thereby insuring withdrawal of both of the operator's hands from the fixture before the cover thereof is closed. The safety trip mechanism comprises a hand lever 250 fixed on the forward end of a horizontal rock shaft 251 mounted in the base 96 of the fixture. The rock shaft 251 extends rearwardly and adjacent the rear end thereof, an arm 252 is fixed. The arm 252 is connected by means of a link 253 to one arm of a bell crank 254 mounted on the fixture base 96 adjacent the cover actuating piston and cylinder device 150. The other arm of the bell crank 254 constitutes a latch 255 adapted to be pivoted into a position beneath a shoulder 256 formed by the lower end of the rack 154 and a spring 257 acting between the stationary guide 155 and the bell crank 254 urges the latch 255 toward its active position.

In the use of the safety trip mechanism, the hand lever 250 must be actuated and the latch 255 held out of the path of the shoulder 256 until the rack 154 has been moved a substantial distance in a cover-closing direction.

*Operation*

At the start, the table 14 is in the central position of Fig. 1, the cover 97 is in its open position, the ejecting pins 126 are in their lowermost or inactive positions, and the locating fingers 105 are withdrawn to their inoperative positions as shown in Fig. 7. The operator inserts one piston W into each sleeve 98 with the closed ends of the pistons facing downwardly in position to contact the locating pins 99$^a$. In loading the pistons W, the operator places the bearings A in approximate alinement with the tools.

The operation of the machine may then be instituted, and for this purpose the operator must withdraw both hands from the fixture and simultaneously actuate the safety trip handle 250 and the starting switch 217.

The closure of the switch 217 starts the motor 189 which by rotation of the control shaft 185, causes the cam 225 to close the switch 221 to establish a running circuit for the motor. As the control shaft 185 rotates, the cam 182 actuates the valve member 166 to close the cover 97. In the closing movement of the cover 97 the clamps 115 are positioned within the skirts of the pistons W and the clamping bars 102 are yieldingly pressed into engagement with the upper ends of the pistons W so as to move the same into contact with the locating pins 99$^a$.

The cam 183 then shifts the valve member 167 to cause movement of the locating fingers 105 rearwardly of the fixture. In the course of such movement, the ends 105$^a$ enter the bearings A and engage the sides thereof to aline same with the tools.

While the bearings of the pistons W are held in alinement with the tools by locating fingers 105, the cam 184 shifts the valve 168 and thereby causes the piston and cylinder device 152 to operate the clamps 115 and secure the pistons W in position. The cam 183 then permits withdrawal of the locating fingers 105 out of the path of the tools. Rotation of the control shaft 184 is now stopped due to opening of the switch 230 in the running circuit by movement of the work table 14 from its central position.

The initiation of the automatic cycle of table movement is controlled by the shaft 185 through the medium of the piston and cylinder device 151 which, during its actuation of the locating fingers 105 also operates the manual table control plunger 80. In the rearward movement of the locating fingers 105, the slide 236 and its latch 238 are actuated rearwardly so that the latch rocks the lever 92 and depresses the table control plunger 80. The hydraulic connections between the plunger 80 and the table stop valve 53 cause the latter to be depressed, thereby releasing the dog 86, and the valve 53 is held in its depressed table-stopping position until the plunger 80 is withdrawn by forward movement of the locating fingers 105. The stop valve 53 is then released for upward movement whereby it institutes the table movement.

Due to the positioning of the direction valve 23, the table moves to the left (Fig. 19) and after moving the pistons W through a roughing operation with respect to the tools 12, the dog 58 engages the reversing valve plunger 47 which causes reversal of the direction valve 23, resets the reversing plunger 46 in its uppermost position, and institutes movement of the table 14 to the right. In such movement to the right, the dog 86 is ineffective and the table moves to the right until the finishing operation is performed by the tools 12ᵃ, after which the reversing valve plunger 46 is actuated and the table reversed so as to return to the left to its central position.

As the table reaches its central position in its movement to the left (Fig. 19) the stop dog 86 depresses the stop plunger 53 and stops the table. Simultaneously, the dog 231 actuates the arm 232 (Fig. 12) and closes the switch 230, thus closing the running circuit to the motor 189 and instituting the unclamping cycle of the control shaft 185. In the initial portion of this cycle the cam 184 permits the valve 168 to return to its initial position thereby causing the clamps 115 to be released. The valve 166 is then permitted to reverse its position and the cover is opened by its actuating device 150, and at substantially the same time the notch 227 in the cam 226 is moved into registry with the plunger 223 so that the switch 221 is opened and the rotation of the control shaft 185 stopped.

As the cover opens, the pawl 139 (Fig. 11) engages the tooth 141 on the rotatable arm 133, and through the link 142, levers 141 and 121, causes the work ejecting pins 126 to be moved upwardly against the retracting action of the spring 131. After the pistons W have been raised a sufficient distance to overcome any wedging action between the pistons and the sleeves 98, the pawl 139 engages the stationary cam surface 146 and is shifted radially to release the tooth 141 so that the ejector pins are withdrawn by the spring 131. In the subsequent closing of the cover, the pawl 139 is again engaged with the tooth 141 and conditioned for actuating the ejector pins.

The operator then removes and replaces the finished work and institutes another cycle of operation as above described.

It should be observed that in the forward movement of the slide 236, the latch 238 strikes the abutment screw 248 and is disengaged from the plunger operating arm 92 so that the table may be stopped at any time during the machine operation by shifting one of the manually operable control levers 94.

I claim as my invention:

1. A machine tool having, in combination, an element movable in a work performing cycle and having an idle position, a work fixture, a work clamping device on said fixture, power driven means controlling the movements of said device, a manually operable member for initiating operation of said power driven means to cause clamping movement of said device, means constituting a running circuit for supplying power to said power driven means to continue operation thereof after actuation of said manually operable member, a control member for said element operable by said power driven means after completion of said clamping movement to initiate the cyclic movement of said element, means governed by said element and operable upon movement of said element from its idle position to interrupt said running circuit and stop said power driven means and operable upon return of said element to its idle position to reestablish said running circuit to cause unclamping movement of said device, and means to break said running circuit upon completion of said unclamping movement.

2. A machine tool having relatively movable tool and work supports, means operable to move one of said supports automatically through a work performing cycle and to stop said support upon completion of said cycle, a work fixture on said work support, a work-clamping device on said fixture, actuating means for said device operable to move said device successively through a clamping movement and an unclamping movement, means for manually initiating said clamping movement, means operable as an incident to the clamping movement of said device to initiate the working cycle of said movable support, and means responsive to movement of said movable support to interrupt the operation of said device and at the end of said working cycle to initiate the unclamping movement of said device.

3. A machine tool having an element movable in a work performing operation, a work fixture having a clamp, actuating means for said clamp, a control device for said actuating means, a motor for driving said control device, a normally open starting circuit for said motor adapted to be manually closed, a running circuit for said motor arranged to be opened after a predetermined number of revolutions of said motor, a switch in said running circuit controlled by said element, and means adapted to be actuated by said control device to initiate movement of said element.

4. A work fixture having a seat for the work, a clamp for securing the work against said seat, an actuator for operating said clamp, a work ejector normally urged toward an inactive position, a disengageable latch connection between said actuator and said ejector for moving said ejector to its active position as said actuator releases said clamp, and means operable to release said latch connection during the terminal portion of the releasing movement of the clamp to permit return of said ejector to its normal inactive position.

5. A machine tool having a base, a movable work table, automatically operable means for moving said table through a work performing cycle, said means including a manually shiftable control member on said base for starting and stopping the movement of said table, a work fixture mounted on and movable with said table, means for clamping a work piece in position on said fixture, and an element on said fixture positioned adjacent said control member when said table is in its idle position and movable as an incident to the operation of said clamping means to actuate said control member and institute said cycle.

6. In a machine tool having a movable element, automatically controlled means for actuating said element, said means including a control member movable into one position to prepare said means for initiation of the working movement of said element, and then into another position to initiate said movement, a work-clamping fixture, actuating means for clamping said fixture, and means operable as an incident to the clamping operation to move said control member to said one position during said clamping operation and then to shift said member to said other position, said last mentioned means being arranged to release said member for manual actuation while in said other position.

7. In a machine tool having an element movable in a work performing operation, automatically controlled means for driving said element through a work performing cycle, said means including a control member operable first in one position to prepare said means for initiation of said cycle, and then in another position to effect initiation of said cycle, a work clamping fixture, actuating means for clamping said fixture, means operable as an incident to said clamping operation to move said control member to said one position during said clamping operation and then to said other position.

8. A machine tool comprising tool and work supports mounted for relative movement along a given path, a tool on said tool support, a work fixture on said work support adapted to have a work piece inserted thereinto laterally with respect to said path to position the work piece in said fixture for engagement with said tool, a closure member to enclose the work piece within the fixture, and a guard on said fixture extending longitudinally with respect to said path beyond said tool to guard said tool in all positions of said supports relative to each other.

9. In a boring machine having a bed, oppositely positioned alined boring tools mounted substantially horizontally at opposite ends of said bed and projecting toward each other, a table mounted on said bed for reciprocation parallel to said tools, a work fixture mounted on said table between said tools, said fixture having a hollow base section open at the top and having side walls projecting upwardly beyond said tools, means providing a work receiving seat within said base section, shiftable closure means for the top of said base section, said side walls having openings therein to permit engagement of said tools with the work, and guards secured to said base section and extending in opposite directions from said fixture above and downwardly along the sides of the tools.

10. A machine tool having a work-clamping device, power means for actuating said device, manually operable control means for effecting clamping operation of said device by said power means, a latch normally preventing operation of said device by said power means, and manually operable releasing means for said latch requiring actuation by one hand of the operator while the operator's other hand is used to operate said control means.

11. In a work fixture, the combination of a hollow base, means providing a seat for receiving a cylindrical work piece having a transverse bore, a slide mounted for movement transversely of the axes of the work piece and the bore, a pair of elongated locating fingers with their longitudinal axes extending generally along the path of movement of said slide, and pivoted intermediate their ends on said slide for scissors-like movement, the corresponding ends of said fingers extending toward each other for movement into the ends of said bore, and cam means acting between said base and the other ends of said fingers to pivot the same toward and away from each other in the reciprocation of said slide.

12. A work-locating device comprising a pair of fingers, a reciprocable slide upon which said fingers are pivoted for movement of corresponding ends of said fingers laterally into opposite ends of a bore in a work piece, said slide being mounted for movement transversely with respect to the desired longitudinal direction of the bore, and cam means operable in the movement of said slide toward the work to pivot said fingers into the end of said bore and in retractive movement of said slide to move said fingers out of the bore.

13. A work-locating device for a generally cylindrical work piece with a bore at right angles to its axis comprising a support, work-locating elements mounted on said support for movement toward and away from each other to position the same from the exterior of the work piece within opposite ends of the bore, said support being movable in a direction transverse to the direction of said first mentioned movement to cause said elements when in the bore to rotate the work until both elements contact the side of the bore to locate the axis of the bore, and means for imparting said movements respectively and in unison to said support and elements.

14. A machine tool comprising, in combination, a pair of tools for operating in opposite ends of a bore in a work piece, means for moving said tools from positions spaced from the work piece into said bore, work-locating elements for positioning said work piece to aline said bore with said tools, means for moving said elements transversely of said tools, and means for superimposing upon said transverse movement a movement longitudinally of said tools to position said elements within said bore, the transverse movement thereby rotating said work piece, said elements thereafter being withdrawn to positions out of the way of said tools.

15. A machine tool comprising relatively movable tool and work supports, means for moving one of said supports through a work performing cycle, work-clamping means on said work support, mechanism for effecting the clamping and unclamping movements of said work-clamping means, manually operable control means for said mechanism to initiate clamping movement of said work-clamping means, means for initiating movement of said support-moving means operable by said work-clamping means, and control means in parallel with said manually operable control means operable by the movable support at the start of said cycle to halt operation of said mechanism at the completion of the clamping movement and at the end of said cycle to renew operation of said mechanism to effect unclamping movement of said work-clamping means.

16. A machine tool having an element movable in a work performing operation, means for moving said element, a work fixture having a clamp, an actuator for said clamp, a control device for said actuator, a motor for driving said control device, a normally open starting circuit for said motor adapted to be manually closed, a running circuit for said motor, a switch in said running circuit adapted to be held closed by said element but adapted to be opened and closed by movement of said element to halt and renew operation of said device, and a second switch in said running circuit adapted to be opened by said control device to stop operation of said device.

17. A machine tool having an element movable in a work performing operation, mechanism for moving said element through a working cycle, a work fixture having clamping means, an actuator for effecting clamping and unclamping movements of said clamping means, a control device for said actuator, a motor for driving said control device, a normally open starting circuit for said motor adapted to be manually closed, a connection between said clamping means and said mechanism for initiating said cycle at the completion of the clamping movement, a running cycle for said motor, a switch in said running circuit adapted to be opened by movement of said element at the initiation of said cycle whereby said motor is stopped at the completion of the clamping movement and adapted to be reclosed by said element at the completion of said cycle whereby said motor is restarted to initiate unclamping movement, and a second switch in said running circuit adapted to be opened by said control device at the completion of said unclamping movement.

CHRISTIAN A. BIRKEBAK.